United States Patent [19]

Roubinet et al.

[11] Patent Number: 4,895,023
[45] Date of Patent: Jan. 23, 1990

[54] WEATHERVANE WITH MAGNETIC BEARING

[75] Inventors: Michel M. Roubinet, Paris; Jacques A. Bauman, Boutigny Sur Essone, both of France

[73] Assignee: Franklin France, Paris, France

[21] Appl. No.: 275,136

[22] PCT Filed: Feb. 5, 1988

[86] PCT No.: PCT/FR88/00063
§ 371 Date: Oct. 5, 1988
§ 102(e) Date: Oct. 5, 1988

[87] PCT Pub. No.: WO88/05916
PCT Pub. Date: Aug. 11, 1988

[30] Foreign Application Priority Data

Feb. 9, 1987 [FR] France ............................. 87 01522

[51] Int. Cl.⁴ ............................. G01P 13/02; G10D 11/02; F16C 39/06
[52] U.S. Cl. ............................. 73/188; 310/90.5
[58] Field of Search ............................. 13/188, 189, 861.85; 310/90.5

[56] References Cited

U.S. PATENT DOCUMENTS

| 1,093,063 | 4/1914 | Mellinger | 73/188 |
| 2,611,051 | 9/1952 | Kolff | 73/188 |
| 3,691,829 | 9/1972 | Perry | 73/189 |

FOREIGN PATENT DOCUMENTS 0003776 9/1979 European Pat. Off. .
1163632 9/1969 United Kingdom .

OTHER PUBLICATIONS

Patent Abstracts of Japan, vol. 7, No. 244 (M.252) (1389), Oct. 1983, No. 58-131426(A).

Primary Examiner—Charles A. Ruehl
Attorney, Agent, or Firm—Charles E. Baxley

[57] ABSTRACT

A weathervane includes a pointer (8a, 8b) provided with a vane and mounted for rotation about a vertical shaft (1) by a magnetic bearing. The magnetic bearing is comprised of a lower block (2a) made integral with the shaft (1) and of an upper block (2b) capable of rotating freely about the shaft. An upper face of the lower block (2a) and a lower face of the upper block (2b) are each provided with a permanent magnet (10a, 10b), which face each other and are oriented so that they have the same polarity. The pointer (8a, 8b) is made integral with the upper block (2b).

8 Claims, 1 Drawing Sheet

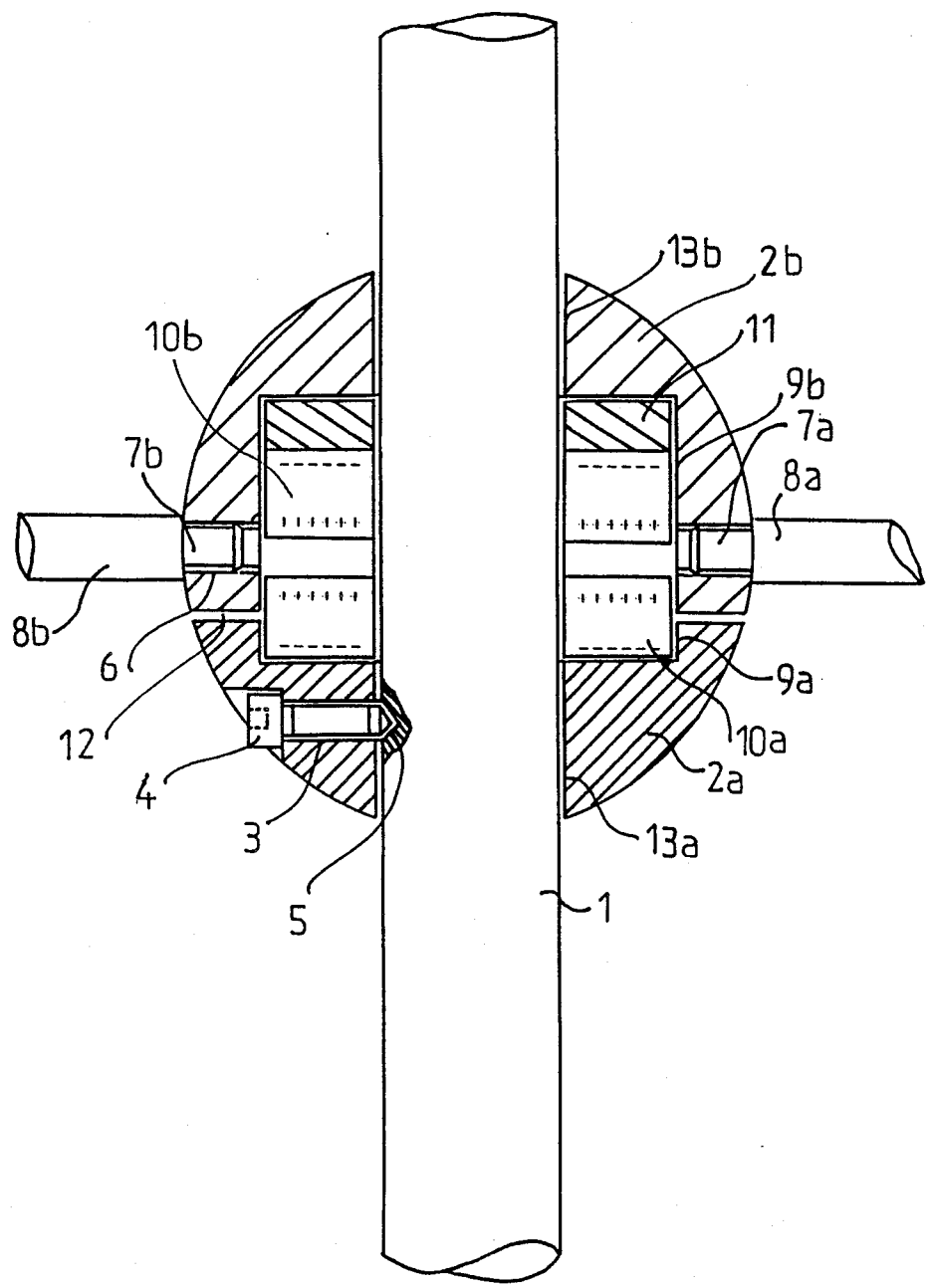

WEATHERVANE WITH MAGNETIC BEARING

The present invention relates to a weathervane of a type comprised of a pointer provided with a vane and rotatingly mounted around a vertical shaft by means of a magnetic bearing of which the principle is known, as for example from the Japanese patent application 58-131426.

For their rotation, weathervanes currently use glass or metal ball bearings, roller devices, or a simple shaft.

Some of these devices are simple but unreliable, whereas others are more technical but also more costly.

The objective of the present invention is to remedy the inconveniences of the known devices by proposing a rotary mounting means that is simple, reliable, and economical.

This objective is attained by the weathervane according to the invention, in which the rotary mounting is realised by means of a magnetic bearing that is mounted on the vertical shaft and that is composed of a lower block which is held stationary to the vertical shaft and of an upper block capable of turning freely around said shaft, the upper surface of the lower block and lower surface of the upper block each being provided with a permanent magnet, said magnets being placed opposite one another and oriented so that their surfaces which are face-to-face are of the same polarity, the pointer being held stationary to the upper block.

Due to this disposition, the perament magnets repel each other and constantly maintain a distance between the upper block and the lower block. It follows that the upper block with its dependent arrow can turn without friction around the vertical shaft.

In a practical embodiment of the invention, the upper surface of the lower block presents a first recess adapted to receive a first permanent ring-shaped magnet and the lower surface of the upper block presents a second recess opposite the said first recess and adapted to receive a second permanent ring-shaped magnet, said first and second magnets being placed in their respective recesses so that their surface face-to-face are of the same polarity.

Preferably, the second recess offers a sufficient depth to receive one or more magnets joined positive polarity against negative polarity, and/or one or more rings forming adjustment spacers.

One can thus regulate the force with which the magnets of the upper and lower blocks repel each other and, consequently, the spacing between the upper block and the lower block.

Favorably, the rings which form the spacers are made of Nylon.

In a practical embodiment of the invention, the arrow is in two parts, each being held stationary to the upper block.

The lower block and the upper block have a complementary exterior form giving a spherical form to the magnetic bearing which they constitute.

The invention will be better understood after reading the following description in reference to the single FIGURE of the attached drawing.

This FIGURE shows a vertical shaft 1 capable of being attached, for example, to the roof of a building. On this axis 1 are mounted a lower block 2a in the form of a part of a sphere and an upper block 2b, the form of which completes the sphere. The lower block 2a is provided with a threaded boring 3, in which a clamp screw is introduced to the point of penetrating into a conical recess 5 provided for in the shaft 1. The lower block 2a is thus held stationary in regards to the shaft 1. The upper block 2b is provided with a boring 6 traversing it from side to side which is adapted to receive, at each extremity, a dowel, 7a and 7b respectively, depending on the part of a pointer, 8a and 8b respectively. It is understood that, for example, the part 8a ends in an arrow point and that the part 8b ends in a vane.

The upper surface of the block 2a is provided with a cylindrical recess 9a adapted to receive a permanent ring-shaped magnet 10a.

Facing the recess 9a, the upper block is provided with a recess 9b adapted to receive a permanent ring-shaped magnet 10b. As can be seen, the magnets 10a and 10b are positioned so that their surfaces of like polarity are face to face.

The recess 9b is deeper than the recess 9a, which would eventually permit several ring-shaped magnets to be placed there which, in this case, are coupled positive polarity against negative polarity, or as is represented, a Nylon ring 11 forming an adjustment spacer. In playing with the thickness of this ring 11 and/or the number of magnets 10b, the force which is exercised between magnet 10a and magnet 10b can be regulated and by consequence the importance of the space 12 maintained between the lower block 2a and the upper block 2b.

The lower block 2a and the upper block 2b each contain a bore 13a, 13b permitting the passage of the shaft 1.

It is to be understood that when the force of the wind acts on the vane forming the extremity 8b of the pointer, the force is transmitted to the upper block 2b of the magnetic bearing and that this block 2b turns around the axis of the shaft 1 without friction on the block 2a.

What we claim is:

1. A weathervane comprising a pointer (8a, 8b) provided with a vane and mounted for rotation on a vertical shaft (1) by means of a magnetic bearing (2a, 2b), characterized in that:

the magnetic bearing (2a, 2b) includes a lower block (2a) mounted fixedly on the shaft and an upper block (2b) connected for free rotation around the shaft (1) with the pointer (8a, 8b) connected to the upper block (2b), the lower block (2a) has an upper surface and the upper block (2b) has a lower surface arranged opposite the upper surface, a first permanent magnet (10a) on the upper surface and a second permanent magnet (10b) on the lower surface, said first and second magnets being of the same polarity.

2. The weathervane according to claim 1 and characterized further in that:

said upper surface has a first recess (9a) formed therein and adapted to receive the first magnet (10a) which is ring shaped, said lower surface has a second recess (9b) formed thereon and adapted to receive the second magnet (10b) which is ring shaped.

3. The weathervane according to claim 2 characterized in that the second recess (9b) is of sufficient depth to receive a plurality of magnets stacked therein in positive polarity against negative polarity orientation.

4. The weathervane according to claim 3 with the pointer in two parts (8a, 8b) both mounted fixedly to the upper block.

5. The weathervane according to claim 2 characterized further in that the second recess (9b) is of sufficient depth to receive the magnet (10b) and at least one spacer ring (11) thereabove.

6. The weathervane according to claim 5 characterized further in that the ring (11) is made of nylon.

7. The weathervane according to claim 5 with the pointer in two parts (8a, 8b) both mounted fixedly to the upper block.

8. The weathervane according to claim 1 characterized further in that the lower block (2a) and the upper block (2b) each defines an exterior complementary to the other to comprise a sphere.

* * * * *